N. D. PARKER AND H. C. LOMB.
RANGE FINDER.
APPLICATION FILED JULY 10, 1918.

1,363,670.

Patented Dec. 28, 1920.
2 SHEETS—SHEET 1.

Witness
J. Gordon Parker.

Inventors
Newell D. Parker
Henry C. Lomb

N. D. PARKER AND H. C. LOMB.
RANGE FINDER.
APPLICATION FILED JULY 10, 1918.

1,363,670.

Patented Dec. 28, 1920.
2 SHEETS—SHEET 2.

UNITED STATES PATENT OFFICE.

NEWELL D. PARKER AND HENRY C. LOMB, OF NEW YORK, N. Y.

RANGE-FINDER.

1,363,670.  Specification of Letters Patent.  Patented Dec. 28, 1920.

Application filed July 10, 1918. Serial No. 244,167.

*To all whom it may concern:*

Be it known that we, NEWELL D. PARKER and HENRY C. LOMB, citizens of the United States of America, residing at New York city, in the borough of Manhattan and State of New York, have invented certain new and useful Improvements in Range-Finders, of which the following is a specification.

Our invention relates to a method and apparatus designed to facilitate the determination of the distance from a point of observation to any visible object.

The principal object of our invention is to furnish a simple method, and an efficient and compact means to determine the distance or "range," as generally understood in military or other operations.

A further object of our invention is to so construct the reading scales that practically all calculations are reduced to a minimum. In the present forms of "range finders" in this particular class, the "mil system" is generally used, and to reduce the readings to units of measurement requires careful calculation and is therefore operable only in the hands of officers or especially trained persons.

Another object is to reduce the mechanical design to the simplest form consistent with the operation, and to make the whole device so compact that it can be carried in the pocket.

The details of method and construction will be better understood by reference to the accompanying drawings, which form a part of this specification, and in which—

Figure 1:
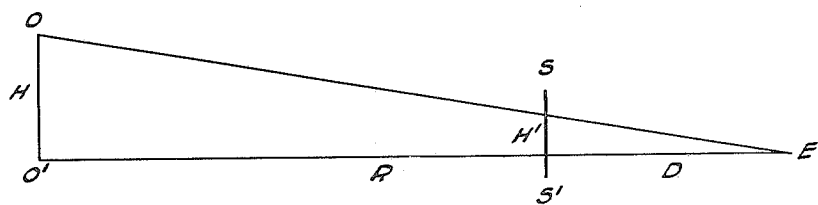
Figure 1 is a diagrammatic view, showing the geometrical relations of the various distances which are used in the determination.

In Fig. 1, $OO^1$ represents a distant object of size H; E represents the eye of the observer, and the distance from the eye to the object is the range and is designated by R. A graduated scale $S—S^1$ is interposed between the eye and the object and is held by the observer at a convenient distance D from the eye.

Sighting over the scale the object $OO^1$ will appear to cover a certain portion of the scale, designated in the figure by $H^1$.

Now, from similar triangles, we have—

$$\frac{R}{H} = \frac{D}{H^1}$$

or $$R = \frac{H D}{H^1}$$

It follows that if we select an object of known size, H, and graduate our scale so that the factor $\frac{D}{H^1}$ can be read off directly thereon, we will be able to determine the distance or range of the object by a single mental calculation, namely, by multiplying the size of the object by the number or factor given by the scale.

In general, the distance D at which the scale is most conveniently held by the observer will be constant for that observer. It is obvious that the factor $\frac{D}{H^1}$ as appearing in the above equation is the product of this distance D and the reciprocal of the length $H^1$ subtended by the object on the scale. In other words the graduations on the scale will not form a scale of equal parts but will be proportional to the reciprocals of the natural numbers.

To plot this scale so as to facilitate the reading and attain the greatest ease of calculation it is of advantage to choose the graduations in such a manner that they themselves represent whole numbers.

This is best accomplished by placing $$\frac{D}{H^1} = N;$$

wherein N represents the whole numbers, 1, 2, 3, 4, etc., and then by writing the equation $$H^1 = \frac{D}{N}$$

We may substitute these whole number values of N directly and solve for values of $H^1$. Thus, we obtain the values or rather distances $H^1$ on the scale which correspond to the integral values of $\frac{D}{H^1}$.

For example, put D=500 millimeters and we may construct the following table by substituting the various values for N.

| N | $H^1$ |
|---|---|
| 1 | 500 mm. |
| 2 | 250 " |
| 3 | 166.7 " |
| 4 | 125 " |
| 5 | 100 " |
| 10 | 50 " |
| 25 | 20 " |
| 100 | 5 " |

Figure 2:
Fig. 2 is a diagrammatic scale plotted from the calculated table, appearing in the body of the specification.

The graphical representation of these values of $H^1$ appear in Fig. 2 and are measured from the left end of the line. Under the graduation is the factor or the numerical value of $\frac{D}{H^1}$, which is equal to N.

Figure 3:
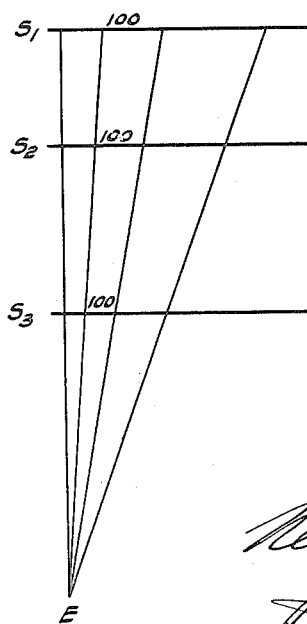
Fig. 3 is a diagrammatic view showing the method of contructing scales to be used at various distances from the eye.
Figure 4:
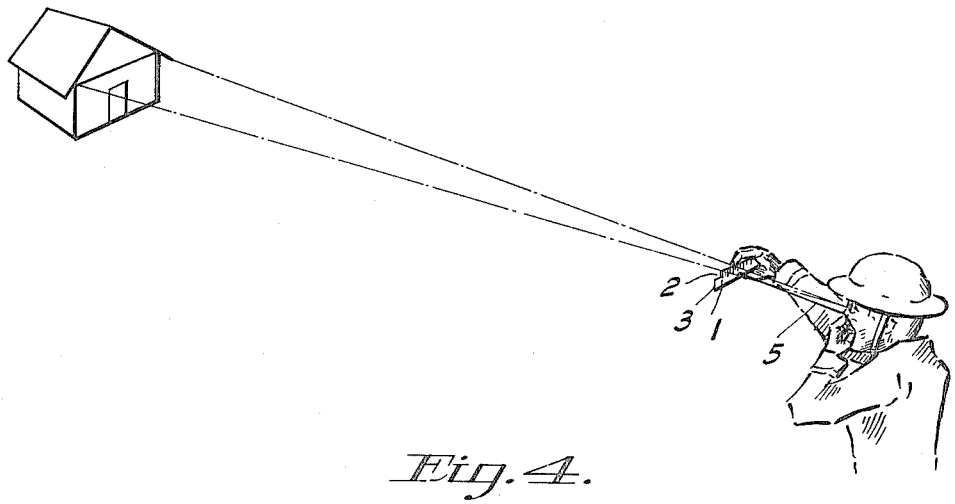
Fig. 4 is a perspective view showing the range finder in use.
Figure 5:
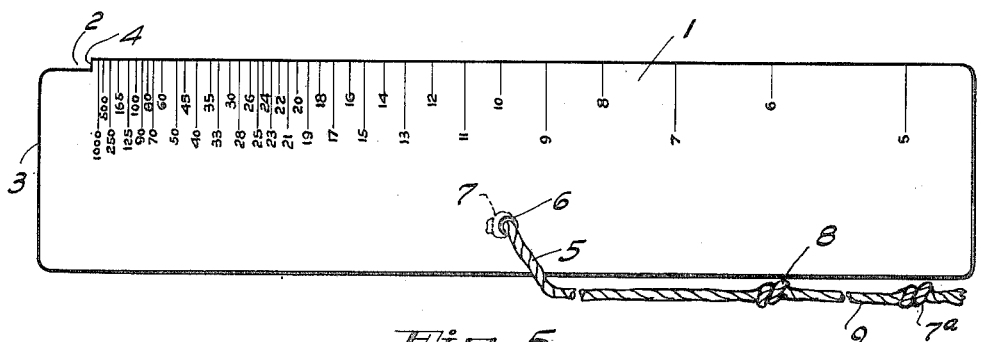
Fig. 5 is a plan view of the range finder.

Similar scales for various values of D may be plotted to scale in the well known geometrical form as shown in Fig. 3 in which the several diagrams are combined and serve as a check upon each other if lines are passed through similar values of N upon each scale and to the eye.

That is, in Fig. 3, E represents the eye of the observer, and when, N=1 and D=500 millimeters the plotted value of $H^1$ falls at 100 on scale $S_1$; when D=250 the value $H^1$ falls on 100 on scale $S_2$ and likewise when D=100 the value of $H^1$ falls on 100 on scale $S_3$. A straight line will pass through all points 1 and point E. Thus a simple check may be made on any scale or set of scales.

As a specific embodiment of our invention we have provided a rule 1 of a convenient size for the pocket and yet sufficiently large to carry the scale figure. At the upper left edge of the scale we have provided a notched out corner 2 so as to remove the zero point of the scale from the edge 3, where it would be subjected to undue wear. Beginning at the vertical edge 4 formed as the right edge of the notch the scale is begun and the calculated distances for each factor are measured from this vertical edge as zero. In order to always set the scale at the proper distance D from the eye of the observer I have provided a cord 5 fastened to the rule 1. The rule is provided with a hole 6 through which this cord 5 is passed, and to retain the cord in position knots 7 and 7ª are tied in each end of the cord. The proper distance from the scale to the eye is preferably marked off by an extra knot 8 tied near the knot 7ª but sufficient intervening cord is provided to form a short holding section 9. The observer holds the knot 8 directly under his eye with the section 9 grasped in the hand. It is apparent that when not in use the cord may be simply wrapped around the rule, wherein the whole device may be carried in the pocket.

In order to avoid the difficulty of observing the object and also viewing the scale with one eye at the same time, the finger or a rider may be moved over the scale as an index and the apparent size of the object observed between the finger and the zero edge 4.

Figure 6:
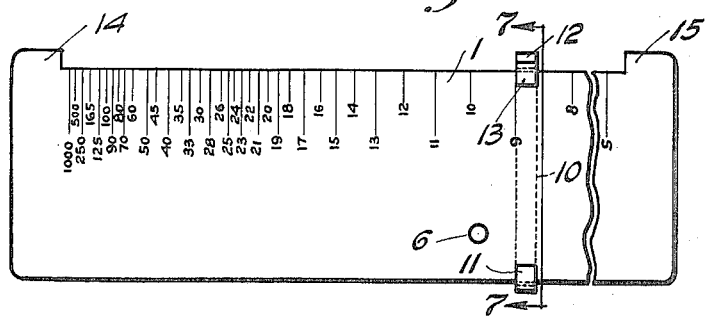
Fig. 6 is a plan view of the range finder showing a modified form in which a rider is used to mark more accurately the reading on the scale.
Figure 7:
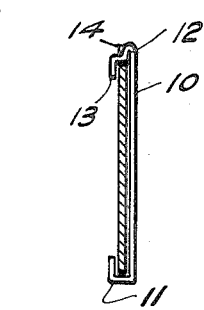
Fig. 7 is a section taken on the line 7—7 in Fig. 6.

In Fig. 6, the zero mark or left edge of the scale is formed with an integral projection 14, which may be sighted against an edge of the object. Likewise, the other end of the rule carries a projection 15, this forming between 14 and 15 a reading notch, and it will be noticed that these projections also serve as stops to retain a rider or index 10.

As a modification of this use of the finger as an index, we have shown a simple sliding index 10 having a lower hook like end 11 which engages the lower edge of the rule and an upwardly projecting end 12 which rises above the scale and thereby furnishes a reading edge. A hook 13 similar to hook 11 is formed integral with part 12 and when the index has been set in place on the rule, prevents removal.

It is understood that this design is only one of the many modifications of the specific construction that might be devised within the scope of the invention as herein set forth and claimed.

In operation, the observer notes some distant object to which he desires the range, and preferably an object with which he is sufficiently familiar to closely estimate the size in one dimension—for instance the width of a window, a man's height or a wagon wheel.

Then holding the scale with arm extended directly forward at the level of the eye so that the scale will be at the calculated distance from the eye, the observer reads the apparent size of the object as measured on the scale.

Having thus described our invention what we claim as new and desire to secure by Letters Patent is:—

1. A range finder comprising a plate having a reciprocally divided scale, a zero point on said scale adapted to be sighted to alinement with an edge of a distance object, and means adapted to position said scale at predetermined distance from the eye of the user, substantially as described.

2. In a range finder, a plate having a reciprocally divided scale, an upright edge at the zero position of said scale adapted to be sighted to alinement with an edge of a distant object; a flexible cord attached to said scale and having a knot tied therein adapted to be held at the eye so as to position the scale at a predetermined distance from the eye of the user, and numerical factors positioned at points of graduation on said scale, which when multiplied by the estimated size of the said object produce the numerical value of the distance to be determined.

3. In a range finder, a plate having a reciprocally divided scale, a rider adapted to slide laterally over said scale and to project substantially above the reading edge of said scale, one edge of said rider positioned perpendicular to said scale and adapted to be used as a sighting edge in alinement with one edge of a distant object; an upright edge at the zero position on said scale, adapted to be sighted to alinement with the other edge of the said distant object; a flexible cord attached to said scale and having a knot tied therein adapted to be held at the eye of the user so as to position the scale at a predetermined distance from the eye, and numerical factors positioned at points of graduation on said scale, which when multiplied by the estimated size of the said object produce the numerical value of the distance to be determined.

In testimony whereof we affix our signatures.

NEWELL D. PARKER.
HENRY C. LOMB.

Witness:
CHARLOTTE SEGLER.